Patented May 17, 1938

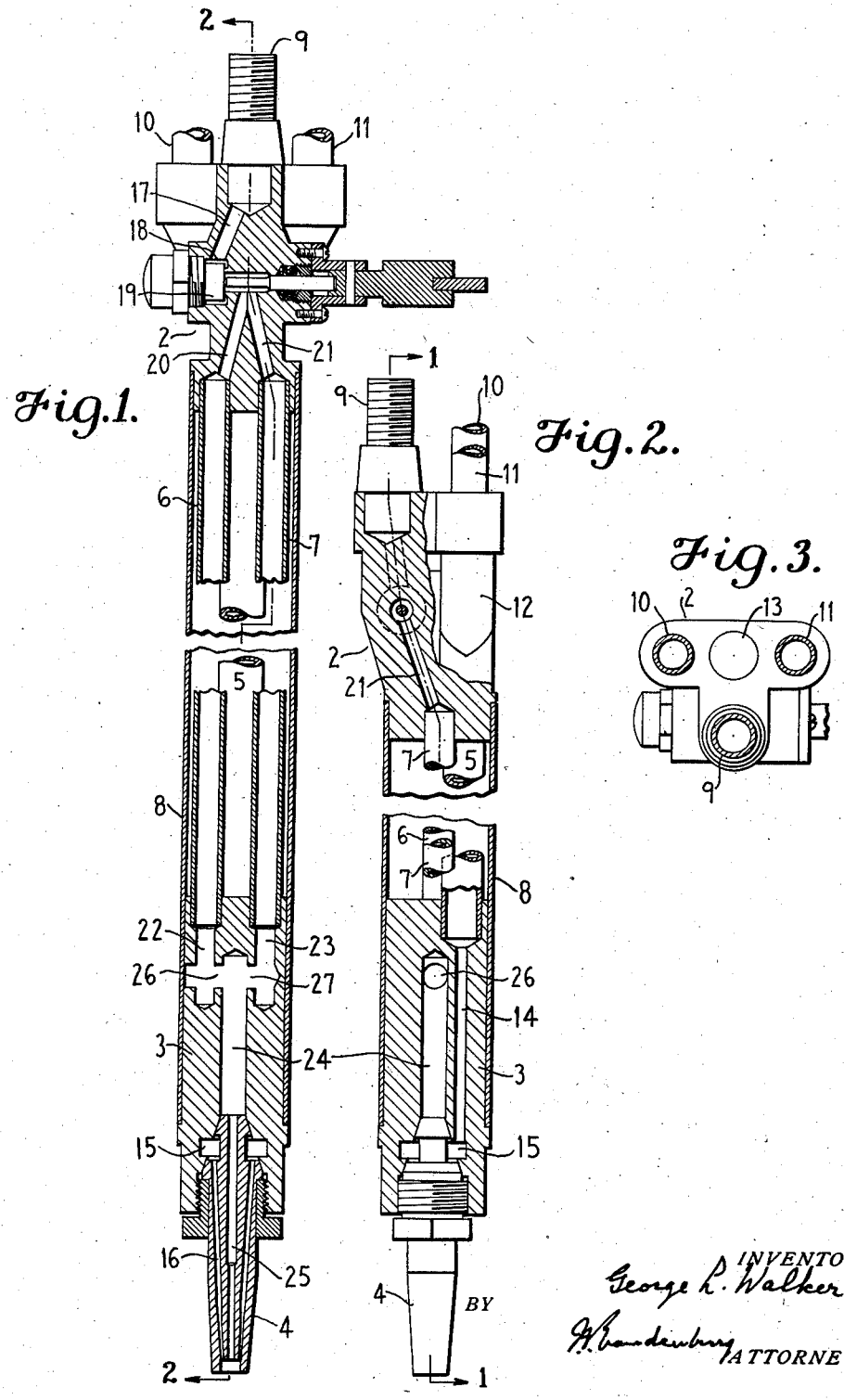

2,117,751

UNITED STATES PATENT OFFICE 2,117,751

CUTTING TORCH

George L. Walker, Jersey City, N. J., assignor to Air Reduction Company, Incorporated, New York, N. Y., a corporation of New York Application January 21, 1936, Serial No. 60,057

2 Claims. (Cl. 158—27.4)

This invention relates to torches or blowpipes of the kind used for cutting metal.

The object of the invention is to provide a construction which is advantageous mechanically, and which insures the delivery of a well formed cutting oxygen stream. The torch of this invention has provisions in the torch proper for conducting two separate oxygen flows and for combining these flows into one stream in such manner that the velocity across the stream delivered from the cutting orifice is equalized.

In the accompanying drawing forming part hereof:

Fig. 1 is a view, principally in longitudinal section, through a torch constituting a preferred embodiment of the invention, the section being taken on the line 1—1 of Fig. 2, and portions of the torch intermediate the ends being broken out;

Fig. 2 is a similar view, the section of which is taken on the line 2—2 of Fig. 1; and Fig. 3 is a rear end elevation.

The cutting torch illustrated in these views for the purpose of showing a concrete embodiment of the invention has a rear end block 2, a front end block or head 3, a tip 4, tubes 5, 6, and 7 connecting the blocks 2 and 3, and a casing 8 applied to the blocks and surrounding the tubes.

The rear end block has nipples 9, 10, and 11 to receive hoses conducting to the torch oxygen for cutting, oxygen for preheating mixture, and fuel gas for the preheating mixture. This is, therefore, a three-hose torch, but the invention is equally applicable to two-hose torches, in which, as is well known, a single entering stream of oxygen is divided inside the torch into two streams, one for cutting and one for preheating. In the torch shown, the connection 9 is for cutting oxygen, the connection 10 is for preheating oxygen and the connection 11 is for fuel gas.

The oxygen from the connection 10 and the acetylene from the connection 11 pass through suitable channels in the rear end block 2 to a suitable mixer housed in the portion 12 of the rear end block, which mixer may be removable through an opening closed by a back cap 13. The nature of such mixers is so well known that it is unnecessary to illustrate a specific mixer construction. The preheating mixture flows from the mixer to and through the tube 5 to a channel 14, or to a pair of such channels, in the head block 3, from which channel or channels the mixture is distributed by way of a recess 15 to the preheating passages 16 of the tip 4. No novelty is claimed in respect to the various preheating provisions of the torch. For simplicity, valves to control the respective preheating gases are not shown.

The two tubes 6 and 7 are cutting oxygen conduits. Cutting oxygen passes through a channel 17 in the rear end block to a valve chamber 18, and thence, when the valve element 19 is unseated, to two divergent channels 20 and 21 which deliver two streams of cutting oxygen to the rear ends of the tubes 6 and 7.

In the head block 3 two dead-end passages 22 and 23, or other suitable recesses, receive the cutting oxygen streams from the forward ends of the tubes 6 and 7, and the streams are combined in a central longitudinal passage 24 which leads the cutting oxygen to the rear end of the cutting oxygen passage 25 of the tip. The passages 22 and 23 are closed at their front ends, and the passage 24 is closed at its rear end. The communication between the two passages 22 and 23 and the central passage 24 is established by a cross-drilling in the head, this cross-drilling forming ports 26 and 27.

The function of this construction is to provide opposing oxygen flows tending to eliminate irregularities in the cutting oxygen stream conducted through the passages 24 and 25 to the terminal cutting jet orifice, the irregularities thus eliminated or reduced being such as would tend to produce a wave condition or a hugging of the oxygen stream to one wall of the orifice. When such conditions exist the quality and efficiency of the cutting operation are impaired, whereas this invention insures that there will be substantially equal velocity across the cutting oxygen stream, or to put it in another way, that the velocities of different portions of the stream, even though not truly uniform, will be of substantially symmetrical distribution.

The provision of two ports, such as the ports 26 and 27, directly opposed to each other and at right angles to the passage 24, is effective for the purpose in view, and these ports are easy to make by cross-drilling. However, the number of the ports, and the precise angular relation may be varied, provided the disposition is symmetrical and such that the separate streams are introduced abruptly.

I claim:

1. A cutting torch having therein a block, and two tubes to conduct separate cutting oxygen streams thereto, said block having two dead-end passages in continuation with said tubes, a central longitudinal passage, closed at its rear end, to conduct the cutting oxygen onward toward a jet orifice, and cross ports placing said two dead-end passages in communication with said central longitudinal passage.

2. A cutting torch comprising a head block adapted to receive a cutting tip, and two tubes to conduct separate cutting oxygen streams to said head block, said head block being formed with a central longitudinal passage to conduct the cutting oxygen to the tip, this passage being closed at the rear end, two longitudinal passages having their axes spaced at opposite sides of the axis of said central passage, these approach passages being closed at their front ends and connected at their rear ends with said tubes, and opposed ports connecting said approach passages with said central passage to combine the two cutting oxygen flows into one stream so that the velocity across the cutting stream delivered from the torch is substantially equalized.

GEORGE L. WALKER.